(12) United States Patent
Varshney et al.

(10) Patent No.: US 8,243,068 B2
(45) Date of Patent: Aug. 14, 2012

(54) METHOD, SYSTEM AND APPARATUS FOR DETERMINING AND MODIFYING SALIENCY OF A VISUAL MEDIUM

(75) Inventors: Amitabh Varshney, Ellicot City, MD (US); Youngmin Kim, College Park, MD (US); Cheuk Yiu Ip, Silver Spring, MD (US)

(73) Assignee: University of Maryland, College Park, MD (US)

( * ) Notice: Subject to any disclaimer, the term of this patent is extended or adjusted under 35 U.S.C. 154(b) by 1046 days.

(21) Appl. No.: 12/153,394

(22) Filed: May 19, 2008

(65) Prior Publication Data
US 2009/0092314 A1 Apr. 9, 2009

Related U.S. Application Data

(60) Provisional application No. 60/938,543, filed on May 17, 2007.

(51) Int. Cl.
*G06T 17/00* (2006.01)
(52) U.S. Cl. ........................................ 345/420; 345/589
(58) Field of Classification Search .................. 345/420, 345/589
See application file for complete search history.

(56) References Cited

U.S. PATENT DOCUMENTS
2002/0154833 A1* 10/2002 Koch et al. .................... 382/325

OTHER PUBLICATIONS

Lee et al. "Mesh Saliency" ACM Transactions on Graphics (TOG)—Proceedings of ACM SIGGRAPH, vol. 24 Issue 3, Jul. 2005, pp. 661-664.*
Hu et al. "Robust Mesh Smoothing" Journal of Computer Science and Technology, vol. 19, No. 4, Jul. 2004, p. 524.*

* cited by examiner

*Primary Examiner* — Maurice L McDowell, Jr.
(74) *Attorney, Agent, or Firm* — Squire Sanders (US) LLP

(57) ABSTRACT

A method, system and apparatus for determining and modifying saliency of a visual medium are provided. The method, system and apparatus may obtain saliency values for a visual medium based on a plurality of visual channels. The saliency values may be obtained based on at least one of computer-generated modeling, user-specified input and eye-tracking. The method, system and apparatus may aggregate the obtained saliency values and classify regions of the visual medium based on the aggregated saliency values. The visual channels may include one or more of absolute mean curvature, a gradient of mean curvature, a gradient of color intensity, color luminance, color opponency, color saturation, lighting and focus. When calculating mean curvature, the method, system and apparatus may calculate a change in mean curvature for a plurality of vertices around a region and displace the vertices in accordance with the calculated change in mean curvature to change a saliency of the region.

18 Claims, 15 Drawing Sheets
(10 of 15 Drawing Sheet(s) Filed in Color)

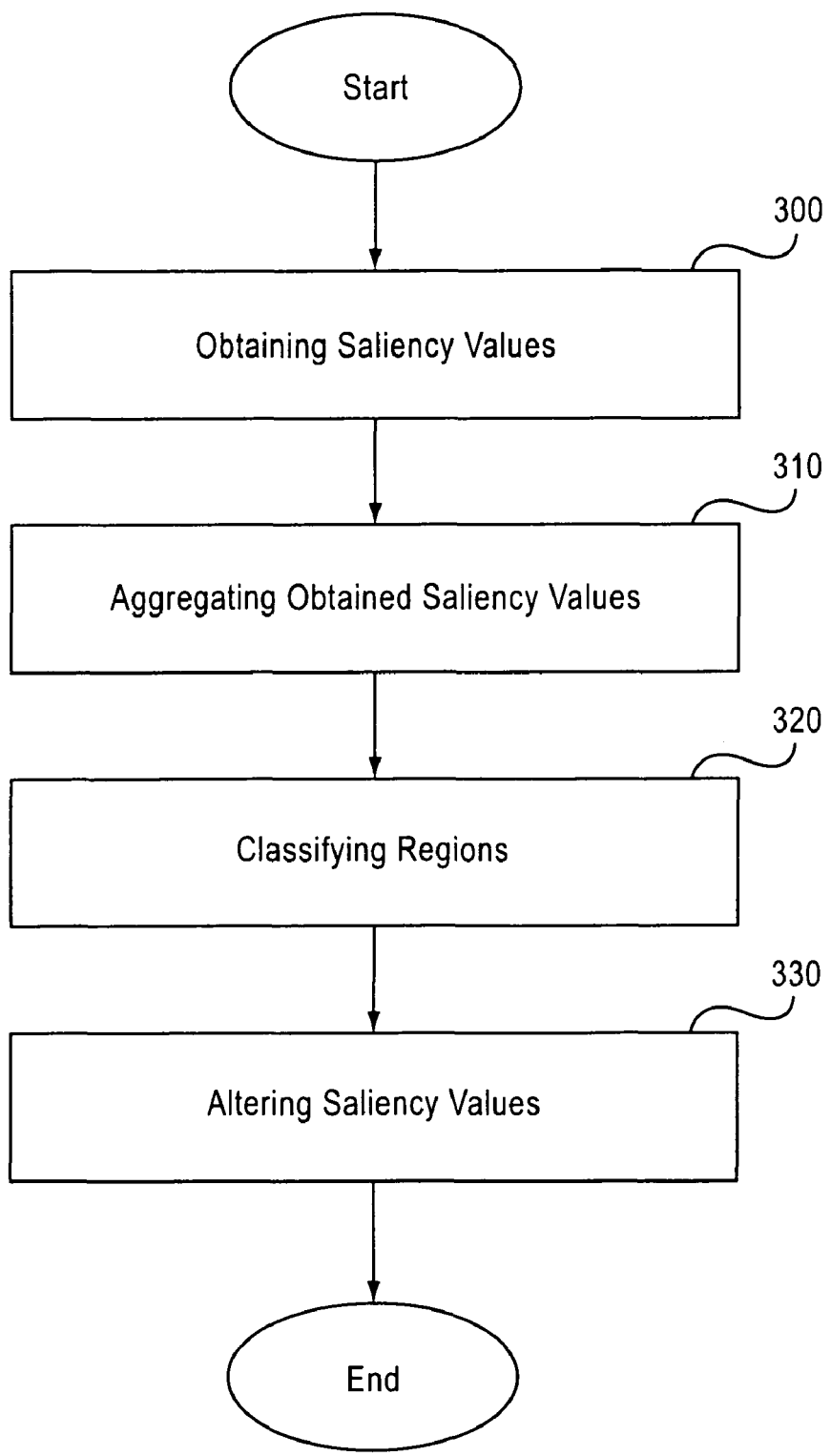

FIG. 4A
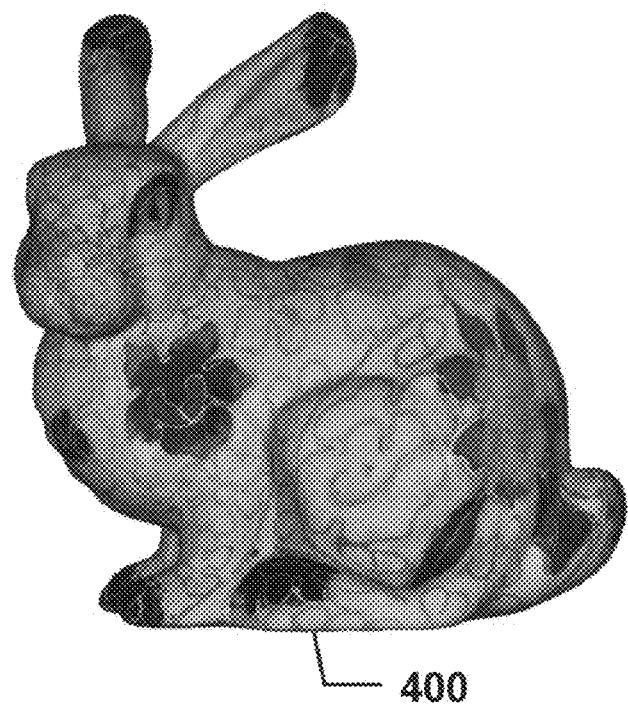
— 400
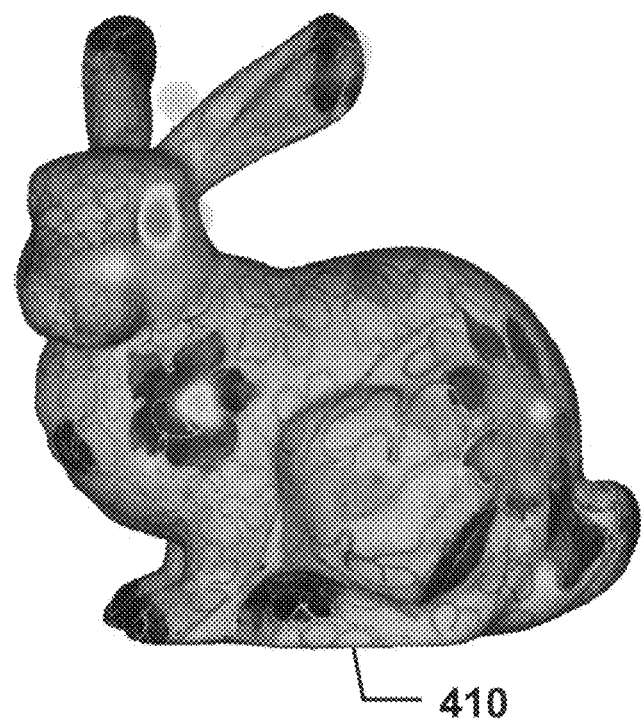
— 410

FIG. 4B
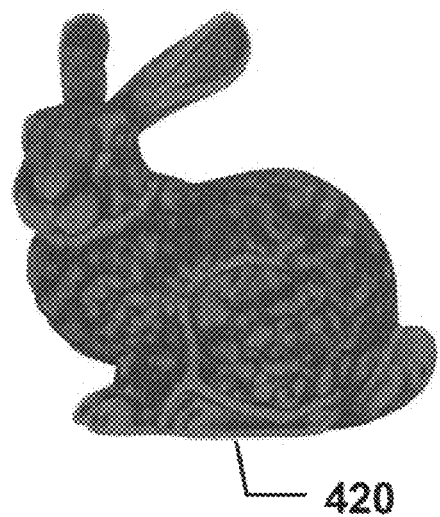
420
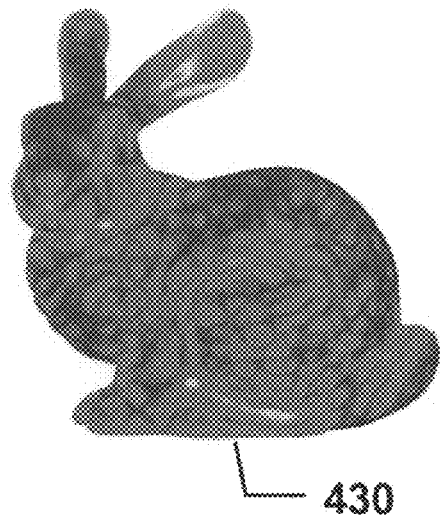
430
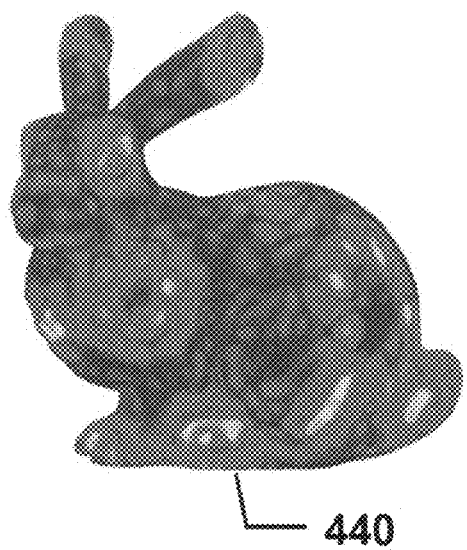
440
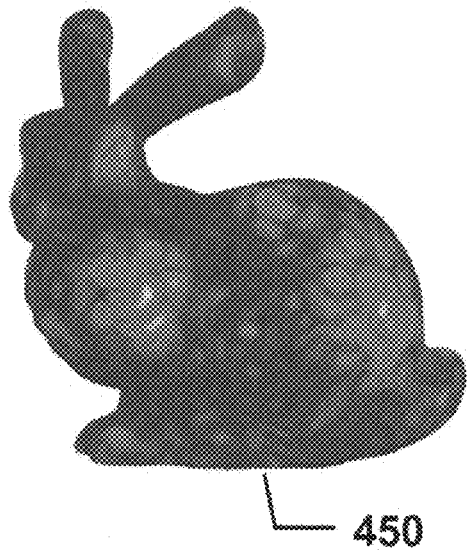
450

METHOD, SYSTEM AND APPARATUS FOR DETERMINING AND MODIFYING SALIENCY OF A VISUAL MEDIUM

CROSS REFERENCE TO RELATED APPLICATIONS

This application claims priority of U.S. Provisional Patent Application No. 60/938,543, filed May 17, 2007. The subject matter of this earlier filed application is hereby incorporated by reference in its entirety.

This invention was made under a contract with an agency of the United States Government. The U.S. Government agency is the National Science Foundation (NSF) and the Government contract number is CFF0541120.

BACKGROUND OF THE INVENTION

1. Field of the Invention

The present invention relates to a method, system and apparatus for determining and modifying saliency of a visual medium. More specifically, the method, system and apparatus may obtain saliency values for a visual medium based on a plurality of visual channels. The saliency values may be obtained based on at least one of computer-generated modeling, user-specified input and eye-tracking. The method, system and apparatus may aggregate the obtained saliency values and classify regions of the visual medium based on the aggregated saliency values. The visual channels may include one or more of absolute mean curvature, a gradient of mean curvature, a gradient of color intensity, color luminance, color opponency, color saturation, lighting and focus. When using mean curvature, the method, system and apparatus may calculate a change in mean curvature for a plurality of vertices around a region and displace the vertices in accordance with the calculated change in mean curvature to change a saliency of the region.

2. Description of the Related Art

While visualization and simulation datasets have been growing at a rapid rate, the capabilities of human perceptual and cognitive systems have naturally remained unchanged. As a result, visualization datasets can often overwhelm the limits of human comprehension. To enable next-generation visual analysis, reasoning and discovery environments, new methodologies are desirable to develop effective visual presentation of important information that is well-grounded in principles of human perception. To address this challenge, it is important to understand the principles that elicit visual attention. Understanding these principles may be useful in allocating computational and rendering resources commensurate with human visual attention, enabling the design of superior algorithms to guide visual attention to regions and objects deemed to be important, and facilitating the development of novel visual abstraction, summarization and depiction methods for visual and simulation datasets by leveraging insights from the human perceptual system.

Visualization systems today are characterized by a rich visual complexity that arises from multiple visual channels, including color, texture and geometry. While each channel may be associated with a saliency field, previous work was solely focused on color and as such, does not consider other channels of visual appearance such as texture and geometry, or in the interactions amongst multiple channels for visual attention. How channels aggregate and the interaction between multiple channels also has not been explored. Further, with respect to geometry, a view independent method has not been presented that changes mean curvature values of vertices to change a saliency of a region.

Accordingly, it may be beneficial to obtain saliency values for a visual medium based on a plurality of visual channels, where the saliency values are based on at least one of computer-generated modeling, user-specified input and eye-tracking, aggregate the obtained saliency values, and classify regions of the visual medium based on the aggregated saliency values. In the case that one of the visual channels is geometry, it may be useful to calculate a change in mean curvature for a plurality of vertices around a region and displace the vertices in accordance with the calculated change in mean curvature to change a saliency of the region.

SUMMARY OF THE INVENTION

Certain embodiments of the present invention may provide solutions to the problems and needs in the art that have not yet been fully solved by currently available visualization technologies. For example, certain embodiments of the present invention may provide, for instance, a method, system and apparatus for determining and modifying saliency of a visual medium.

In one embodiment of the present invention, a method may include obtaining saliency values for a visual medium based on a plurality of visual channels. The saliency values may be obtained based on at least one of computer-generated modeling, user-specified input and eye-tracking. The method may also include aggregating the obtained saliency values and classifying regions of the visual medium based on the aggregated saliency values. In some embodiments, the method may further include increasing or decreasing saliency values of at least one region of the visual medium based on the classification.

In some embodiments, the visual channels may include at least one of absolute mean curvature, a gradient of mean curvature, a gradient of color intensity, color luminance, color opponency, color saturation, lighting and focus.

In certain embodiments, the visual medium may be an image, a video, a web page, a volume, a mesh, or their depiction through various styles of rendering. In some embodiments, at least one of the visual channels may include different scales and the aggregation may include non-linear suppression. The visual medium may also be least a part of an advertisement.

In some embodiments, the plurality of visual channels may include at least one visual channel having multiscale salient features. In certain embodiments, at least one of the plurality of visual channels may be a gradient of mean curvature defined by:

$$S_{gc}(v,\sigma)=|g(C,v,\sigma)-g(C,v,2\sigma)|$$

where C denotes mean curvature values around a vertex v and $g(C,v,\sigma)$ is a Gaussian-weighted average of mean curvature of vertices in neighborhood $N(v,2\sigma)$.

In some embodiments, at least one of the plurality of visual channels may be a gradient of color intensity defined by:

$$S_{gc}(v,\sigma)=|g(I,v,\sigma)-g(I,v,2\sigma)|$$

where I denotes color intensity values around a vertex v and $g(I,v,\sigma)$ is a Gaussian-weighted average of color intensity of vertices in neighborhood $N(v,2\sigma)$.

In some embodiments, at least one of the plurality of visual channels may be color opponency defined by:

$$RG(v,\sigma)=|(g(R,v,\sigma)-g(G,v,\sigma))-(g(R,v,2\sigma)-g(G,v,2\sigma))|$$

$$BY(v,\sigma)=|(g(B,v,\sigma)-g(Y,v,\sigma))-(g(B,v,2\sigma)-g(Y,v,2\sigma))|$$

where RG(v,σ) denotes red/green and green/red double opponency and BY(v,σ) denotes blue/yellow and yellow/blue opponency at a scale σ. The final saliency value $S_{co}(v,\sigma)$ from the color opponency for a vertex v at a scale σ may be the average of RG(v,σ) and BY(v,σ).

In certain embodiments, final saliency values for at least one visual channel having multiscale salient features at a vertex v may be a normalized sum of saliency at all scales.

In another embodiment of the present invention, an apparatus may include an obtaining unit configured to obtain saliency values for a visual medium based on a plurality of visual channels. The saliency values may be obtained based on at least one of computer-generated modeling, user-specified input and eye-tracking. The apparatus may also include an aggregating unit configured to aggregate the obtained saliency values and a classifying unit configured to classify regions of the visual medium based on the aggregated saliency values. In some embodiments, the apparatus may further include a saliency adjustment unit configured to increase or decrease saliency values of at least one region of the visual medium based on the classification vy the classifying unit.

In another embodiment of the present invention, a system may include an input unit, a monitor and a multichannel analysis unit. The multichannel analysis unit may be configured to obtain saliency values for a visual medium based on a plurality of visual channels. The saliency values may be obtained based on at least one of computer-generated modeling, user-specified input and eye-tracking. The multichannel analysis unit may also be configured to aggregate the obtained saliency values and to classify regions of the visual medium based on the aggregated saliency values. In some embodiments, the multichannel analysis unit may be further configured to increase or decrease saliency values of at least one region of the visual medium based on the classification.

In yet another embodiment of the present invention, a method may include calculating a change in mean curvature for a plurality of vertices around a region and displacing the vertices in accordance with the calculated change in mean curvature to change a saliency of the region.

In some embodiments, the change in mean curvature may be a weighted difference of a first and a second Gaussian average.

In some embodiments, the first Gaussian average may be at a finer scale than the second Gaussian average.

In some embodiments, the mean curvature values may be displaced using a Persuasion filter. In certain embodiments, the Persuasion filter may be applied a plurality of times to the region. In certain embodiments, the Persuasion filter may displace the vertices in the region in accordance with the equation:

$$P(v)=v-\Delta C(\text{dist}(v))\cdot d\cdot n$$

where $d_b(v)$ is a distance from a boundary of a region to a vertex v, dist(v) is $r+d_b(v)$ if v is outside of the region and $r-d_b(v)$ if v is inside of the region, d is a displacement in a normal direction n to v from a bilateral mesh filter, and ΔC(dist(v)) is the curvature change map.

In still another embodiment of the present invention, an apparatus may include a calculating unit configured to calculate a change in mean curvature for a plurality of vertices around a region and a displacement unit configured to displace the vertices in accordance with the calculated change in mean curvature to change a saliency of the region.

In some embodiments, the calculating unit may be configured to calculate the change in mean curvature as a weighted difference of a first and a second Gaussian average.

In some embodiments, the calculating unit may be configured to calculate the first Gaussian average at a finer scale than the second Gaussian average.

In some embodiments, the displacement unit may be configured to displace the mean curvature values using a Persuasion filter. In certain embodiments, the displacement unit may be configured to apply the Persuasion filter to the region a plurality of times. In certain embodiments, the displacement unit may be configured to use the Persuasion filter to displace the vertices in the region in accordance with the equation:

$$P(v)=v-\Delta C(\text{dist}(v))\cdot d\cdot n$$

where $d_b(v)$ is a distance from a boundary of a region to a vertex v, dist(v) is $r+d_b(v)$ if v is outside of the region and $r-d_b(v)$ if v is inside of the region, d is a displacement in a normal direction n to v from a bilateral mesh filter, and ΔC(dist(v)) is the curvature change map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3 is a flow diagram illustrating a method for performing multichannel analysis, according to an embodiment of the present invention.

FIG. 4A is a color illustration illustrating the Stanford Bunny Model with high variance texture and eye fixations.

FIG. 4B is a color illustration illustrating multichannel saliency values for the Stanford Bunny Model, according to an embodiment of the present invention.

DETAILED DESCRIPTION OF THE PREFERRED EMBODIMENT(S)

It will be readily understood that the components of various embodiments of the present invention, as generally described and illustrated in the figures herein, may be arranged and designed in a wide variety of different configurations. Thus, the following more detailed description of the embodiments of an apparatus, system, and method of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

Figure 1:
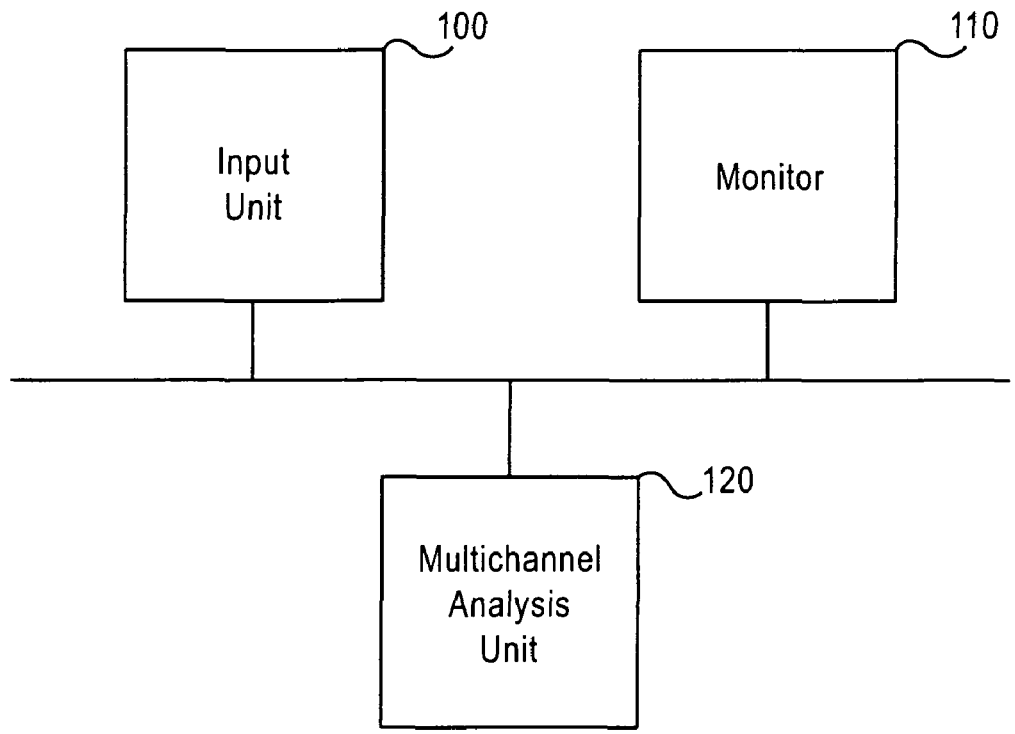
FIG. 1 is a block diagram illustrating a system for performing multichannel analysis, according to an embodiment of the present invention.

FIG. 1 is a block diagram depicting a system for performing multichannel analysis, according to an embodiment of the present invention. The depicted system includes an input unit 100, a monitor 110 and a multichannel analysis unit 120. One skilled in the art will readily understand that "monitor" may include a computer monitor, a laptop LCD screen, a television, a projector, or any other device capable of performing the operations associated with the "monitor" as described herein. One skilled in the art will also readily understand that "input unit" may include a keyboard, a mouse, an eye-tracker, or any other device capable of performing the operations associated with the "input unit" as described herein.

In some embodiments, the user views control software via the monitor 110 and uses the input device 100 to communicate with the multichannel analysis unit 120. The multichannel analysis unit 120 may obtain saliency values for a visual medium based on a plurality of visual channels. The saliency values may be obtained based on computer-generated modeling, user-specified input and/or eye tracking (eye movements may be recorded by an eye tracker, such as the ISCAN ETL-500). The visual channels may include absolute mean curvature, a gradient of mean curvature, a gradient of color intensity, color luminance, color opponency, color saturation, lighting and focus. The visual medium may include videos, webpages, 2-D or 3-D images, a mesh, or any other visual media.

The multichannel analysis unit 120 may then aggregate the input saliency values using unsupervised, semi-supervised or supervised machine learning techniques to devise a classifier. Classifiers recognize patterns in data and may include support vector machines (SVMs). The classifier may then classify regions by saliency based on the aggregated saliency values. The multichannel analysis unit 120 may further make the results of the classifying available for display on the monitor 110. The multichannel analysis unit 120 may also increase or decrease saliency values of at least one region of the visual medium based on the classification.

One skilled in the art will appreciate that a "multichannel analysis unit" could also be embodied as a personal computer, a server, a console, a personal digital assistant (PDA), a cell phone, or any other suitable computing device, or combination of devices. Presenting the above-described functions as being performed by a "multichannel analysis unit" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that many of the functional features described in this specification have been presented as units, in order to more particularly emphasize their implementation independence. For example, a unit may be implemented as a hardware circuit comprising custom very large scale integration (VLSI) circuits or gate arrays, off-the-shelf semiconductors such as logic chips, transistors, or other discrete components. A unit may also be implemented in programmable hardware devices such as field programmable gate arrays, programmable array logic, programmable logic devices, graphics processing units, or the like.

Units may also be at least partially implemented in software for execution by various types of processors. An identified unit of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit. Units may be stored on a computer-readable medium, which may be, for instance, a hard disk drive, flash device, random access memory (RAM), tape, or any other such medium used to store data.

Indeed, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
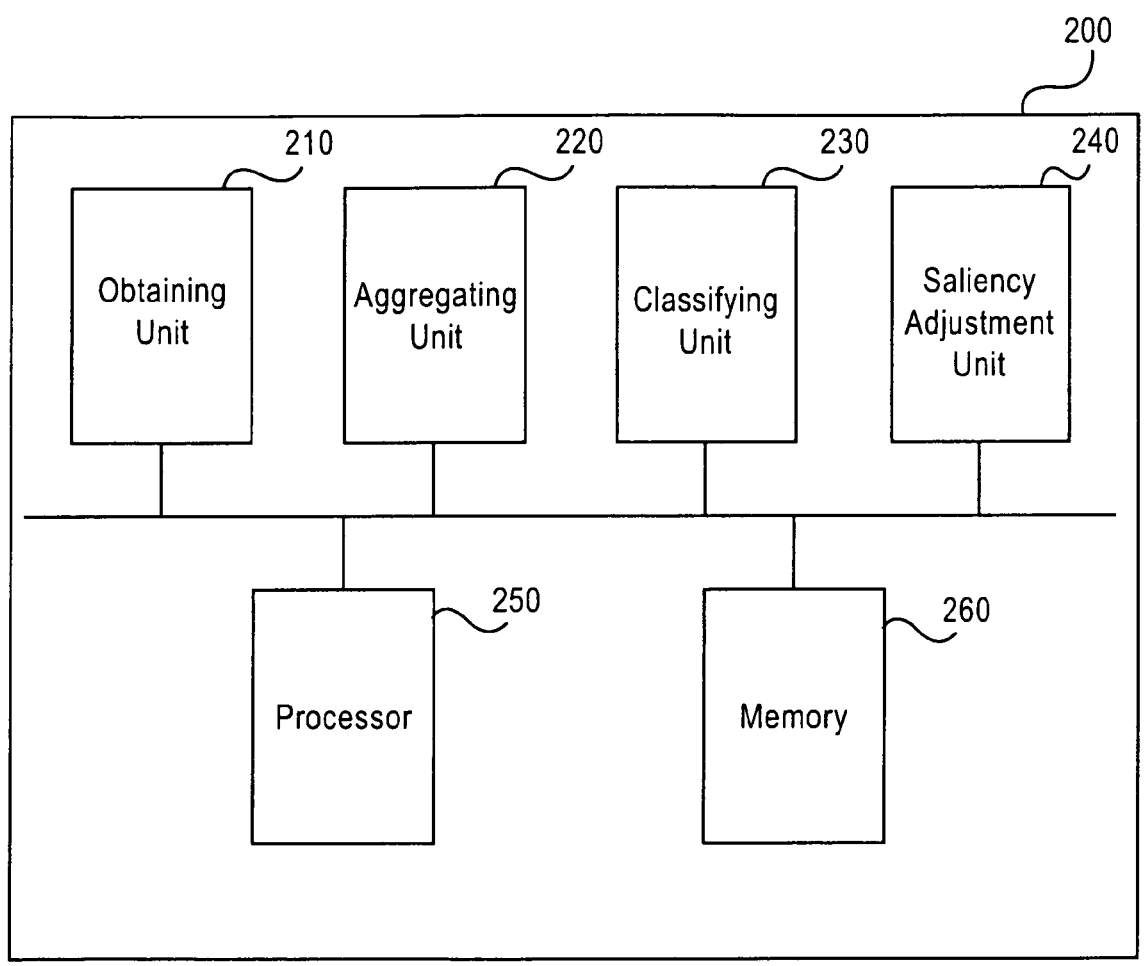
FIG. 2 is a block diagram illustrating a multichannel analysis unit, according to an embodiment of the present invention.

FIG. 2 is a block diagram depicting a multichannel analysis unit 200, according to an embodiment of the present invention. The depicted multichannel analysis unit 200 includes an obtaining unit 210, an aggregating unit 220, a classifying unit 230, a saliency adjustment unit 240, a processor 250 and memory 260. In certain embodiments, the multichannel analysis unit 200 corresponds to the multichannel analysis unit 120 of FIG. 1.

In some embodiments, the obtaining unit 210 may be configured to obtain saliency values for a visual medium based on a plurality of visual channels. The obtaining unit 210 may obtain the saliency values based on computer-generated modeling, user-specified input and/or eye-tracking. The aggregating unit 220 may be configured to aggregate the obtained saliency values using unsupervised, semi-supervised or supervised machine learning techniques. The classifying unit 230 may be configured to classify regions of the visual medium based on the aggregated saliency values. The saliency adjustment unit may increase or decrease saliency values of at least one region of the visual medium based on the classification by the classifying unit.

FIG. 3 is a flow diagram depicting a method for performing multichannel analysis, according to an embodiment of the present invention. The depicted method includes obtaining saliency values 300, aggregating the obtained saliency values 310, classifying regions 320 and altering saliency values 330. In certain embodiments, the operations of the method depicted in FIG. 3 may be executed by the multichannel analysis units 120 and 200 of FIG. 1 and FIG. 2, respectively. The operations of the method provide one embodiment for performing multichannel analysis.

Obtaining saliency values 300 may include obtaining saliency values for a visual medium based on a plurality of visual channels. The saliency values may be obtained based on computer-generated modeling, user-specified input and/or eye-tracking. Aggregating the obtained saliency values 310 may be performed using unsupervised, semi-supervised or supervised machine learning techniques. Classifying regions 320 may include classifying regions of the visual medium based on the aggregated saliency values. Altering saliency values 330 may include increasing or decreasing saliency values of at least one region of the visual medium based on the classification.

In some embodiments, a visual channel of the multichannel analysis may be absolute mean curvature. The importance of the surface curvature has been emphasized in several graphics and visualization applications such as line drawings, 3-D shape matching and mesh simplification. Under Taubin's method (see G. Taubin, "Estimating the Tensor of Curvature of a Surface from a Polyhedral Approximation", Proceedings of IEEE International Conference on Computer Vision, p.p. 902-907 (1995)), the saliency from the absolute value of mean curvature may be defined for a vertex v as Sac(v).

In some embodiments, a visual channel of the multichannel analysis may be a gradient of mean curvature values. Mesh saliency of a vertex v at a scale σ may be defined using a center-surround mechanism as follows:

$$Sgc(v,\sigma)=|g(C,v,\sigma)-g(C,v,2\sigma)|$$

where C denotes the mean curvature values around a vertex v and $g(C,v,\sigma)$ is the Gaussian-weighted average of the mean curvature of vertices in the neighborhood $N(v,2\sigma)$.

In some embodiments, a visual channel of the multichannel analysis may be a gradient of color intensity. The color intensity $I(v)$ for a vertex v $g(C,v,\sigma)$ may be obtained by averaging the rgb color as $$\tfrac{1}{3}(r+g+b).$$

We may then compute the saliency value $Sgi(v,\sigma)$ from the gradient of color intensity for a vertex v at a scale σ using a center-surround operator as follows:

$$Sgc(v,\sigma)=|g(I,v,\sigma)-g(I,v,2\sigma)|$$

where I denotes the color intensity values around a vertex v and $g(I,v,\sigma)$ is the Gaussian-weighted average of the color intensity of vertices in the neighborhood $N(v,2\sigma)$.

In some embodiments, a visual channel of the multichannel analysis may be color opponency. Color opponency is the concept that when neurons are excited by one channel of color (e.g. red), they are inhibited by another (e.g. green), and vice versa. The two pairs of chromatic opponents that exist in the human cortex are red/green (or green/red) and blue/yellow (or yellow/blue).

To compute color opponency (or hue variance), we first may compute four broadly-tuned color channels: R=r−(g+b)/2 for red, G=g−(r+b)/2 for green, B=b−(r+g)/2 for blue, and Y=(r+g)/2−|r−g|/2−b for yellow (negative values are set to zero). Double-opponent color features at a scale σ can be constructed as follows:

$$RG(v,\sigma)=|(g(R,v,\sigma)-g(G,v,\sigma))-(g(R,v,2\sigma)-g(G,v,2\sigma))|$$

$$BY(v,\sigma)=|(g(B,v,\sigma)-g(Y,v,\sigma))-(g(B,v,2\sigma)-g(Y,v,2\sigma))|$$

where $RG(v,\sigma)$ denotes red/green and green/red double opponency and $BY(v,\sigma)$ denotes blue/yellow and yellow/blue opponency at a scale σ. The final saliency value $Sco(v,\sigma)$ from the color opponency for a vertex v at a scale σ is the average of $RG(v,\sigma)$ and $BY(v,\sigma)$.

While absolute mean curvature, gradient of mean curvature, gradient of color intensity and color opponency are discussed above, other visual channels may also be used. For instance, color luminance, color saturation, lighting and focus could also be used as visual channels, as well as other visual channels related to geometry, texture and color.

Some visual channels are multiscale visual channels. These include the gradient of mean curvature values, the gradient of color intensity and color opponency. For combining channels of saliency at different scales, it may be useful to apply non-linear suppression. This suppression promotes scales that have salient samples (or vertices) with a small number of high peaks while suppressing scales with a large number of similar peaks. As such, the procedure emphasizes samples or vertices that are relatively more salient than their neighbors. The final saliency values $Sgc(v)$, $Sgi(v)$ and $Sco(v)$ at a vertex v is the normalized sum of the saliency at all scales.

In some embodiments, when aggregating the saliency values 310, how channels aggregate and the interaction between multiple channels may be taken into account. For instance, a determination may be made whether a region or mesh that has a high color contrast but a low curvature gradient is more effective at eliciting attention than another region that has a high curvature gradient but a lower color opponency. This situation is just one example, and one skilled in the art will recognize that regions with any visual channel or combination of visual channels may be compared. A determination may also be made as to whether some visual channels are superior for eliciting visual attention than others. Further, the altering saliency values 330 may be performed based on this comparison.

FIG. 4A is a color illustration depicting the Stanford Bunny Model with high variance texture and eye fixations. Stanford Bunny 400 has high variance texture designed to encourage a viewer to focus on certain features. Stanford Bunny 410 shows hot spots with warm colors indicating the areas with high viewer fixation counts.

FIG. 4B is a color illustration depicting multichannel saliency values for the Stanford Bunny Model, in accordance with an embodiment of the present invention. Stanford Bunny 420 shows the saliency from the absolute mean curvatures. Stanford Bunnies 430, 440 and 450 show the saliency from the gradient of mean curvatures, the gradient of color intensity and color opponency, respectively, by the normalized sum of the saliency at all scales.

Figure 5:
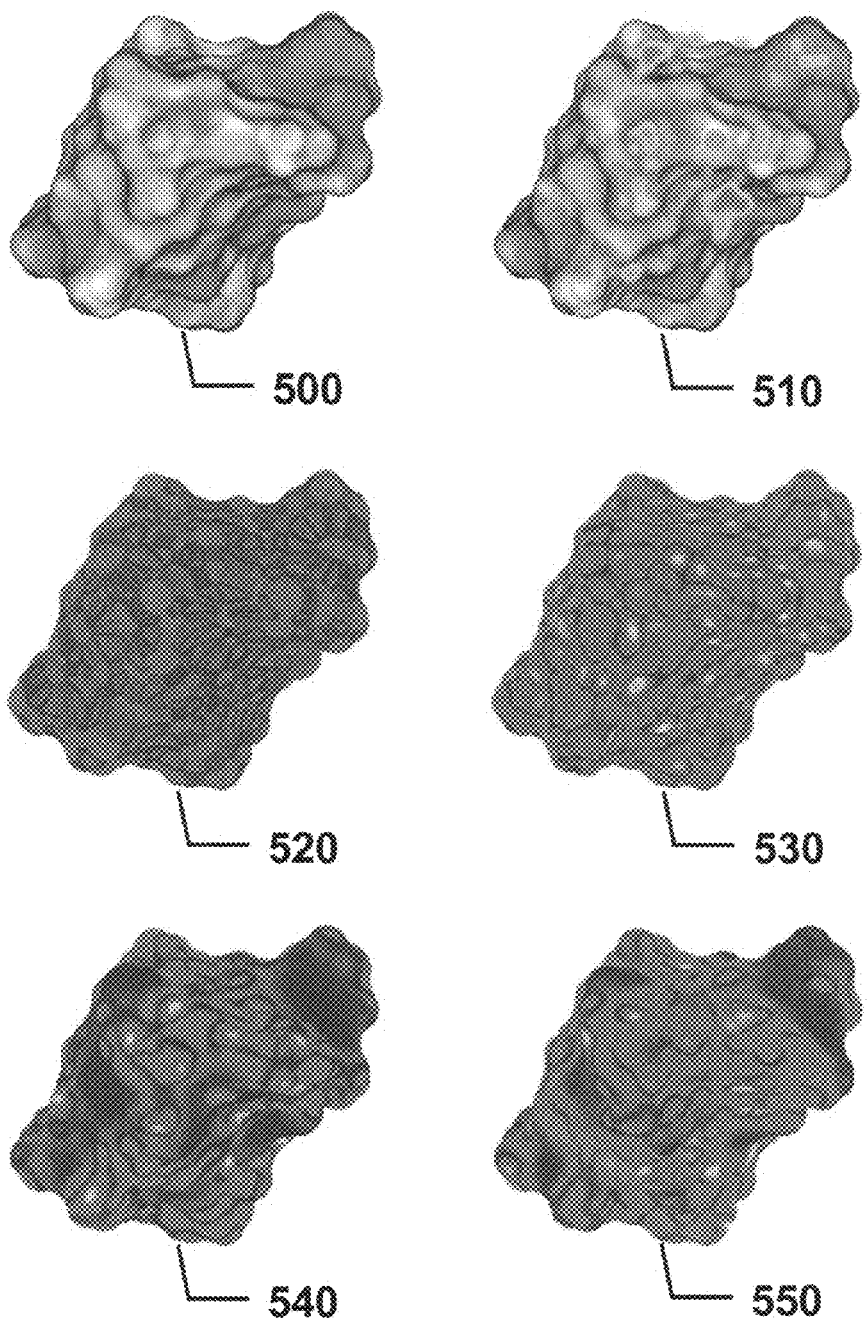
FIG. 5 is a color illustration illustrating the Crambin Model including multichannel saliency values and eye fixations, according to an embodiment of the present invention.

FIG. 5 is a color illustration depicting the Crambin Model including multichannel saliency values and eye fixations, according to an embodiment of the present invention. Crambin Model 500 has high variance texture designed to encourage a viewer to focus on certain features. Crambin Model 510 shows hot spots where warm colors indicate the areas with high viewer fixation counts. Crambin Model 520 shows the saliency from the absolute mean curvatures. Crambin Models 530, 540 and 550 show the saliency from the gradient of mean curvatures, the gradient of color intensity and color opponency, respectively, by the normalized sum of the saliency at all scales.

Figure 6:
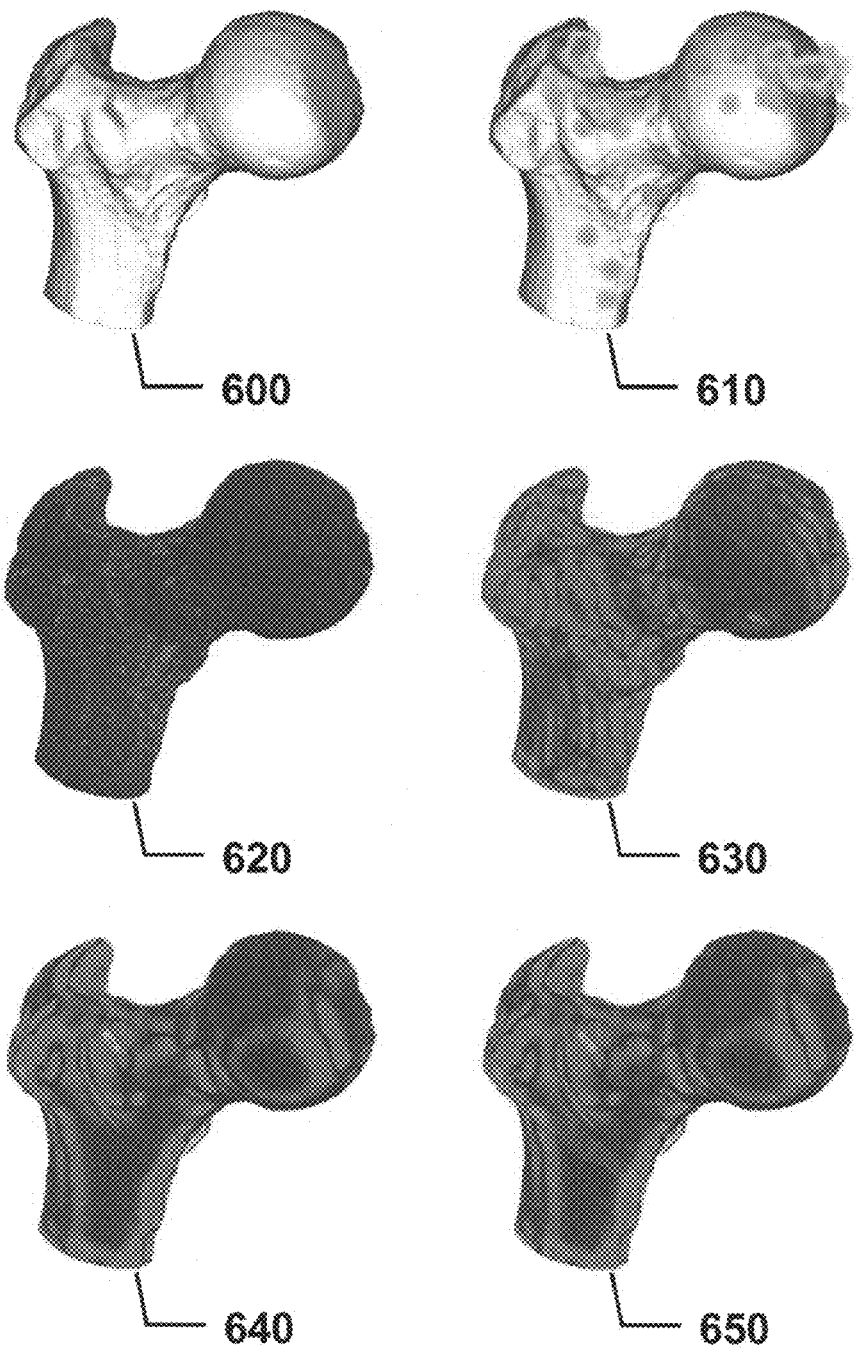
FIG. 6 is a color illustration illustrating a Ball Joint Model including multichannel saliency values and eye fixations, according to an embodiment of the present invention.

FIG. 6 is a color illustration depicting a Ball Joint Model including multichannel saliency values and eye fixations, according to an embodiment of the present invention. Ball Joint Model 600 has high variance texture designed to encourage a viewer to focus on certain features. Ball Joint Model 610 shows hot spots where warm colors indicate the areas with high viewer fixation counts. Ball Joint Model 620 shows the saliency from the absolute mean curvatures. Ball Joint Models 630, 640 and 650 show the saliency from the gradient of mean curvatures, the gradient of color intensity and color opponency, respectively, by the normalized sum of the saliency at all scales.

Figure 7:
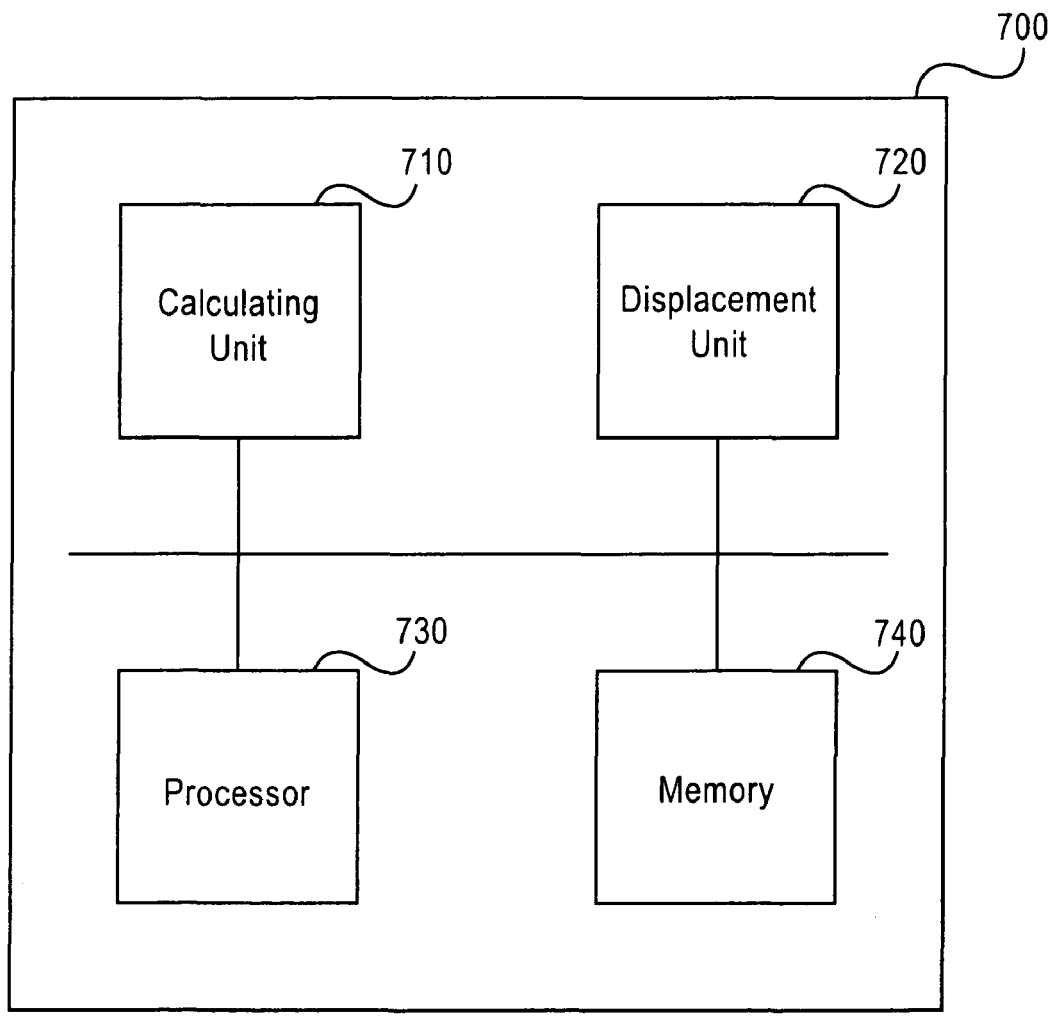
FIG. 7 is a block diagram illustrating a geometric visual persuasion unit, according to an embodiment of the present invention.

As discussed above, absolute mean curvature may be included as a visual channel of the multichannel analysis in some embodiments. FIG. 7 is a block diagram depicting a geometric visual persuasion unit 700, according to an embodiment of the present invention. The depicted geometric visual persuasion unit 700 includes a calculating unit 710, a displacement unit 720, a processor 730 and a memory 740. In certain embodiments, the geometric visual persuasion unit 700 may provide results to the multichannel analysis units 120 and 200 of FIG. 1 and FIG. 2, respectively. The geometric visual persuasion unit may also be implemented as a component of the multichannel analysis units 120 and 200.

The calculating unit 710 may be configured to calculate a change in mean curvature for a plurality of vertices around a region. The calculating unit may calculate the change in mean curvature as a weighted difference of a first and a second Gaussian average. The first Gaussian average may be at a finer scale than the second Gaussian average. The displacement unit may be configured to displace the vertices in accordance with the change in mean curvature calculated by the calculating unit to change a saliency of the region.

Figure 8:
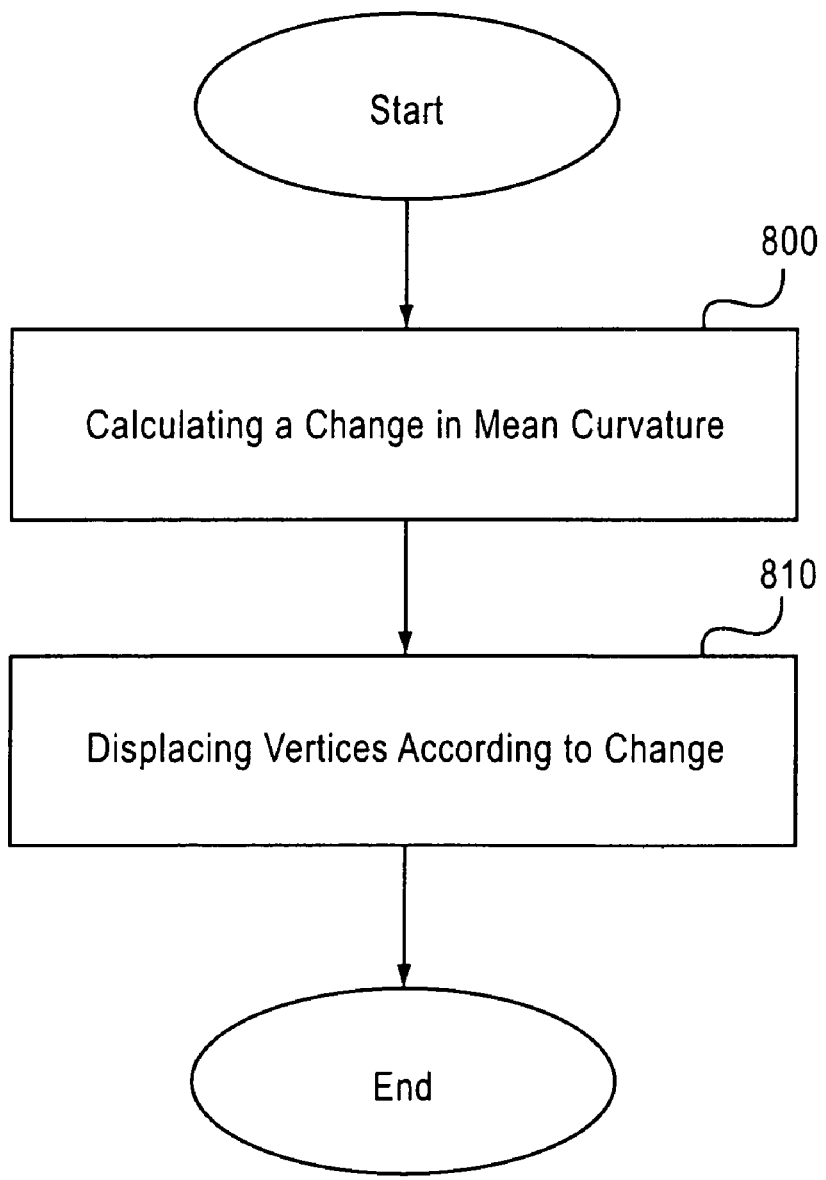
FIG. 8 is a flow diagram illustrating a method for performing geometric visual persuasion, according to an embodiment of the present invention.

FIG. 8 is a flow diagram depicting a method for performing geometric visual persuasion, according to an embodiment of the present invention. The depicted method includes calculating a change in mean curvature 800 and displacing vertices according to the change 810. In certain embodiments, the operations of the method depicted in FIG. 8 may be executed by the geometric visual persuasion unit 700 of FIG. 7. The operations of the method provide one embodiment for performing geometric visual persuasion.

Calculating a change in mean curvature 800 may include calculating a change in mean curvature for a plurality of vertices around a region. The change in mean curvature may be a weighted difference of a first and a second Gaussian average. The first Gaussian average may be at a finer scale than the second Gaussian average. The displacing vertices 810 may include displacing the vertices in accordance with the calculated change in mean curvature to change a saliency of the region.

Figure 9:
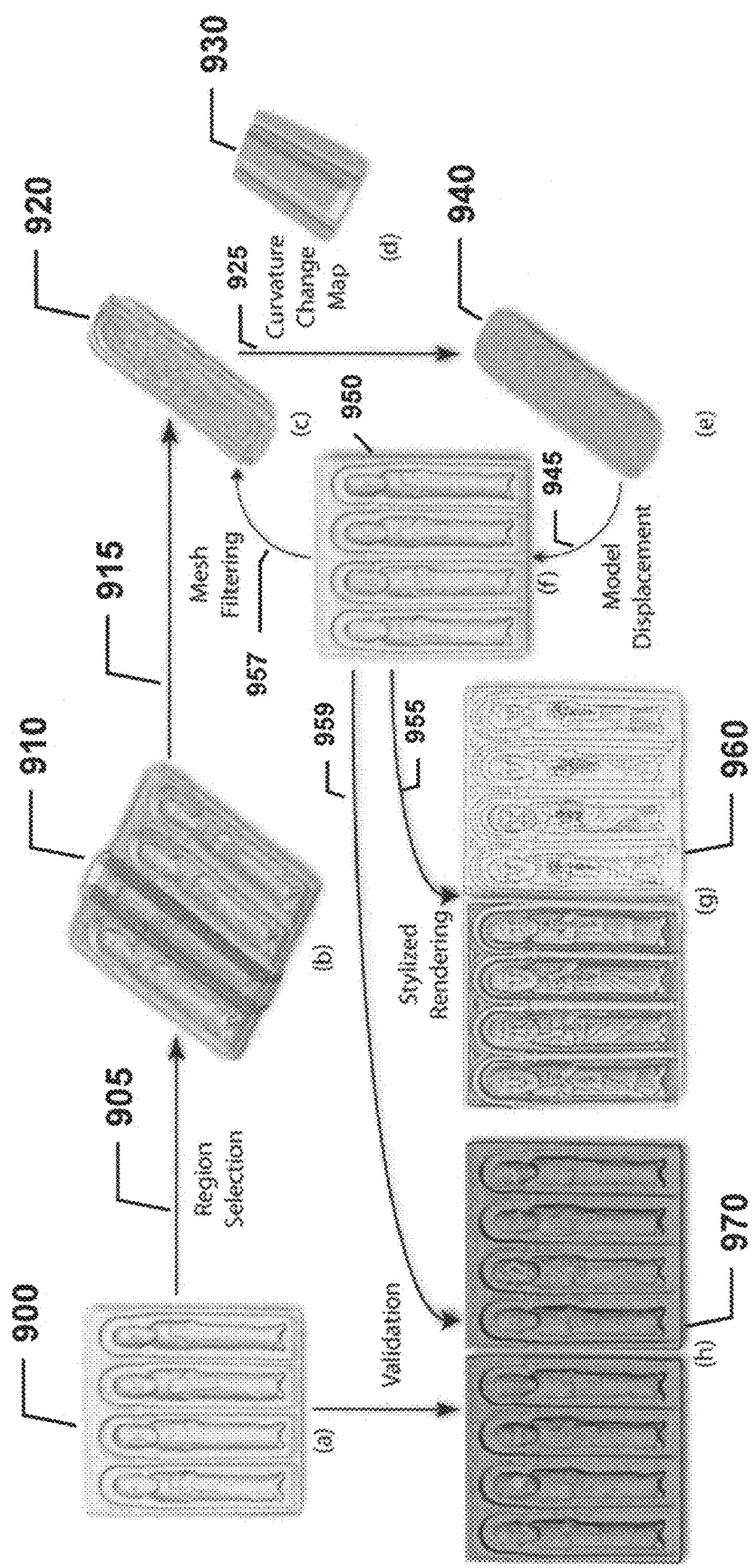
FIG. 9 is a flow diagram illustrating a method of visual persuasion, according to an embodiment of the present invention.
Figure 10:
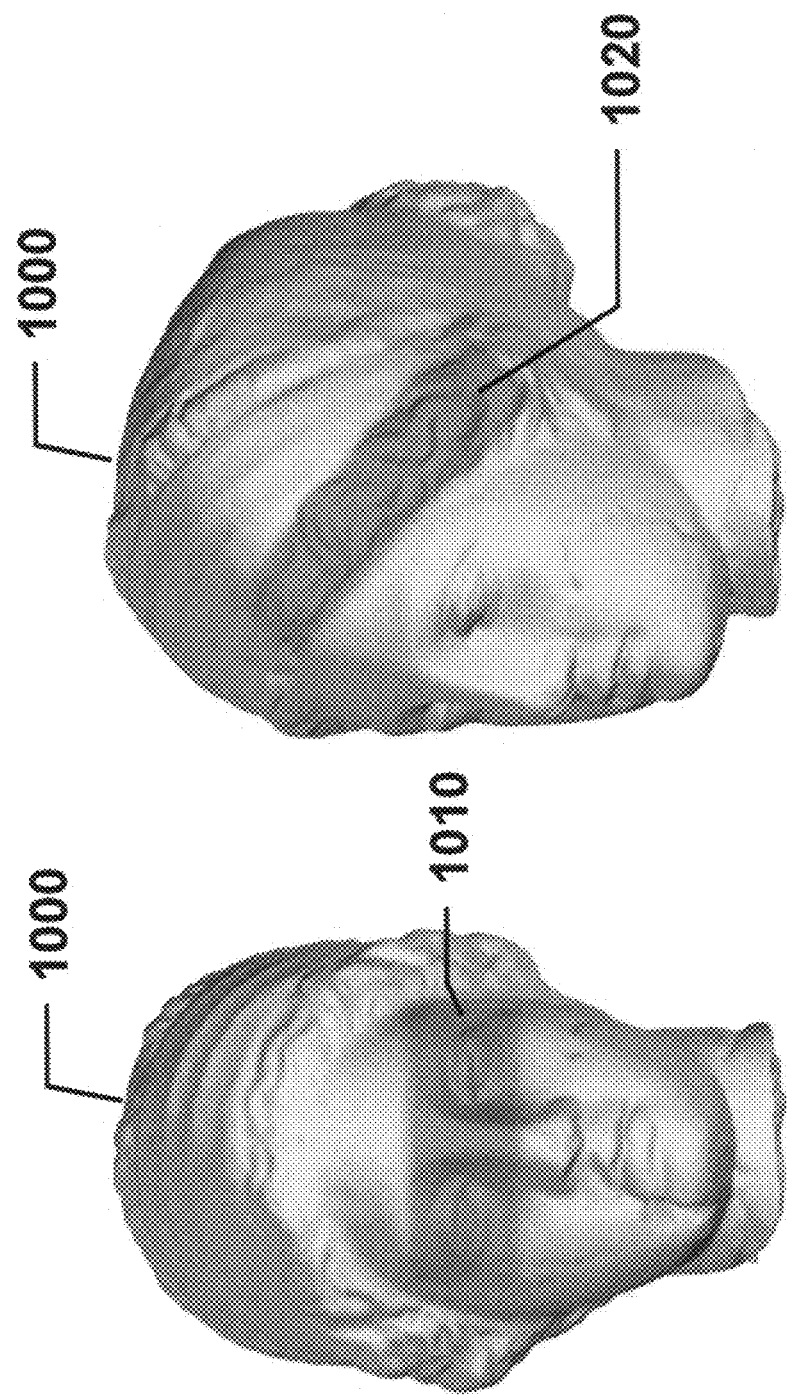
FIG. 10 is a color illustration illustrating region selection on a 3-D model of a statue, according to an embodiment of the present invention.

FIG. 9 is a flow diagram depicting a method of visual persuasion, according to an embodiment of the present invention. A region 910 may be selected 905 over a mesh 900. A content designer may specify regions 910 in a mesh 900 for persuasion adjustment by directly selecting vertices, regions or objects. For instance, a user may wish to draw more attention towards or divert attention away from a certain selected region. An example of such a selection is illustrated in FIG. 10. FIG. 10 is an illustration depicting region selection on a 3-D model of a statue 1000, according to an embodiment of the present invention. In this example, a user has selected two regions 1010 and 1020 on the statue 1000.

Returning to FIG. 6, the user may select 905 a region via any interface suitable for region selection, such as a "what you see is what you get" (WYSIWIG) painting interface. The appropriate mesh triangles and vertices in the in the vicinity of the selected region 910 may then be located. In some embodiments, the size of a "brush" used to select the desired region is variable to provide the user with coarse-to-fine control over the selected region(s). Some embodiments only allow users to select circular, rectangular or spherical regions to isolate effects of the persuasion filter with those arising naturally from the shape of the selected regions, such as a confluence of two linear regions where a T-shaped region is selected.

Mesh filtering 915 over the selected region 910 then provides a set of displacements 920 along the vertex normals. Mean curvature values at vertices around a user-specified region may be changed by using bilateral displacements. The amount of bilateral displacement to provide may be guided by mesh saliency. There are a number of methods to alter the mean curvature values of a mesh, including applying smoothing and sharpening operators, displacing vertices, changing local normals, and applying level-of-detail techniques. Methods that change mean curvature values in a controlled manner may be preferable in some embodiments.

High frequency details at a vertex vi may be captured using Laplacian coordinates in a mesh editing framework as follows:

$$d_i = v_i - \frac{\sum_{(i,j) \in E} w_{ij} v_j}{\sum_{(i,j) \in E} w_{ij}} \quad (1)$$

In this case, the vertices vj are the one-ring neighbors of a vertex vi and $w_{ij}$ is determined using the cotangent weights. Since di is in the local normal direction and the length $\|d_i\|$ is proportional to the mean curvature around vertex vi, Laplacian-based vertex displacement offers a direct way to change mean curvature values in a selected region of interest. However, the vertex displacement di in equation (1) only operates for one-ring neighbors. Thus, it may be preferable to guide the amount of displacement by mesh saliency. Since the mesh saliency operator does not operate at one-ring neighbors, but at a scale σ, it may be preferable to generalize the definition of neighbors with a scale σ. Accordingly, a vertex v may be smoothed with a normal n as follows:

$$S(v) = v + d \cdot n \qquad (2)$$

$$d = \frac{\sum_{p \in N(v, 2\sigma_c)} W_c(\|v-p\|) W_f(<n, v-p>) <n, v-p>}{\sum_{p \in N(v, 2\sigma_c)} W_c(\|v-p\|) W_f(<n, v-p>)}$$

Here, $W_c(x) = e^{-x^2/2\sigma_c^2}$ is the closeness smoothing function with parameter σc that gives a greater weight to vertices closer to the center vertex v, $W_f(x) = e^{-x^2/2\sigma_f^2}$ is the feature weight function with parameter σf that penalizes a large variation in height from the local tangent plane, and N(v,2σc) is the neighborhood of v containing all vertices p such that $\|v-p\| < 2\sigma_c$.

The saliency of a vertex v at a scale σ may be defined using the center-surround mechanism as follows:

$$L(v) = |G(C, v, \sigma) - G(C, v, 2\sigma)|$$

where C denotes the mean curvature values around a vertex v and G(C,v,σ) is the Gaussian weighted average of the mean curvature of vertices in the neighbourhood N(v,2σ). The center-surround mechanism described here is the Difference of Gaussians (DoG) function at a fine scale σ and a coarse scale 2σ. To change mean curvature values around a region, it may be desirable to modify the mean curvature such that the modifications result in the user-defined saliency changes ΔL. To achieve this, the center-surround mechanism may be modified and the center surround operator at vertex v may be defined using the Laplacian of the Gaussian-weighted averages as follows:

$$L(v) = w_1 G(C, v, \sigma) - w_2 G(C, v, 2\sigma)$$

where $w_1$ and $w_2$ indicate the positive weights of the Gaussian weighted averages at a fine and a coarse scale, respectively. Thus, the saliency change at a vertex v can be expressed as:

$$\Delta L(v) = w_1 G(\Delta C, v, \sigma) - w_2 G(\Delta C, v, 2\sigma)$$

where ΔC is defined as the curvature change map. Given a saliency change map ΔL, we can compute the curvature change map ΔC around a vertex v by solving the following system of linear equations:

$$\begin{bmatrix} c_{1,1} & c_{1,2} & \cdots & c_{1,n} \\ c_{2,1} & c_{2,2} & \cdots & c_{2,n} \\ \vdots & \vdots & \ddots & \vdots \\ c_{n,1} & c_{n,2} & \cdots & c_{n,n} \end{bmatrix} \cdot \begin{bmatrix} \Delta C(v_1) \\ \Delta C(v_2) \\ \vdots \\ \Delta C(v_n) \end{bmatrix} = \begin{bmatrix} \Delta L(v_1) \\ \Delta L(v_2) \\ \vdots \\ \Delta L(v_n) \end{bmatrix}$$

where coefficients $c_{ij}$ represent the difference between two Gaussian weights at scale σ and at scale 2σ for a vertex $v_j$ in the neighbourhood of the center vertex $v_i$. Setting the two weights $w_1$ and $w_2$ equal results in a rank-deficient system. It has been observed that the system is stable for unequal weights. This corresponds to defining the saliency function using an aggregate of Difference of Gaussians (DoG) and a Gaussian (G) instead of just a DoG function. Specifically, using the weights $w_1 = 3/4$ and $w_2 = 1/4$, that corresponds to ¼DoG+½G, results in a stable system that prevents the rank deficiency of the coefficient matrix.

We may solve this system of linear equations at multiple scales $\sigma_i$ to get the curvature change map ($\Delta C_i$) at each scale $\sigma_i$. The overall curvature change map 920 may be computed as the multi-scale summation of $\Delta C_i$. We may generalize the spherical region by using distance fields on a mesh. Given a region of interest (ROI) such as selected region 910, we may compute the distance field from the boundary of the ROI and define the radius of the region r as the distance from the inner-most point to the boundary. Where $d_b(v)$ is the distance from the boundary of the ROI to the vertex v, we may define dist(v) as $r+d_b(v)$ for the vertex v outside of the ROI and $r-d_b(v)$ for the vertex v that is inside of the ROI. The resulting curvature change map based on the distance field along the x-axis is shown for a rectangular region 930.

We may change the mean curvature values of the vertices in a mesh by using the bilateral displacements. We may modify the mean curvature around a vertex v by displacing it as follows:

$$P(v) = v - \Delta C(\text{dist}(v)) \cdot d \cdot n \qquad (3)$$

where d is the displacement in the normal direction n for vertex v from a bilateral mesh filter, such as the filter represented by equation (2), and ΔC(x) is the curvature change map. Applicant refers to this new filter as a "Persuasion filter" P.

The curvature change map may be approximated by piecewise $C^2$-continuous degree 4 polynomial radial functions as follows:

$$\Delta C(x) = d(x) + w(x) \cdot g(\rho(x), \sigma(x))$$

$$g(\rho, \sigma) = \left(1 - \frac{\rho}{2\sigma}\right)^3 \left(\frac{3\rho}{2\sigma} + 1\right),$$

if $\rho \leq 2\sigma$, and 0 otherwise
where d(x), w(x), ρ(x) and σ(x) are all determined by:

if $x < \frac{7}{8}r, d = \lambda_+, w = 0$;

else if $x < \frac{10}{8}r, d = -\lambda_-, w = \lambda_+ + \lambda_-, \rho = x - \frac{7}{8}r, \sigma = \frac{3}{16}r$;

else if $x < 2r, d = -\lambda_-, w = 0$;

else if $x < 3r, d = 0, w = -\lambda_-, \rho = x - 2r, \sigma = \frac{1}{2}r$;

otherwise $d = 0, w = 0$.

In certain implementations, it may be preferable to use $0.1 \leq \lambda_- \leq \lambda_+ \leq 0.3$. The Persuasion filter may be used to generate a curvature change map 930. A user may also define a curvature change map through a graphical painting tool. While the above discussion focuses on how curvature can be changed at vertices, saliency values can also be changed for other visual channels using similar methods. One skilled in the art will also recognize that in addition to vertices, the above methods may extend to pixels, voxels and texels.

The vertex displacements 920 may be weighted by the curvature change map 930 and then added 925 to the input mesh 940. Model displacement 945 is then performed on the mesh 900 to create a displaced mesh 950 that may elicit greater or reduced visual attention to the desired region. In some embodiments, the displaced mesh 950 is reintroduced 957 to the Persuasion filtering process. As such, the Persuasion filter may be applied to the selected region 910 multiple times. Experiments have shown that when various rendering styles and illuminations are applied 955, the persuasiveness from Persuasion filtering on the mesh 960 persists. These results have been validated 959 by the results of eye tracking user studies, showing increased user attention to the desired region on the mesh 970. Thus, the results of persuasion filtering early in the graphics pipeline are still apparent after later stages of processing.

Figure 11:
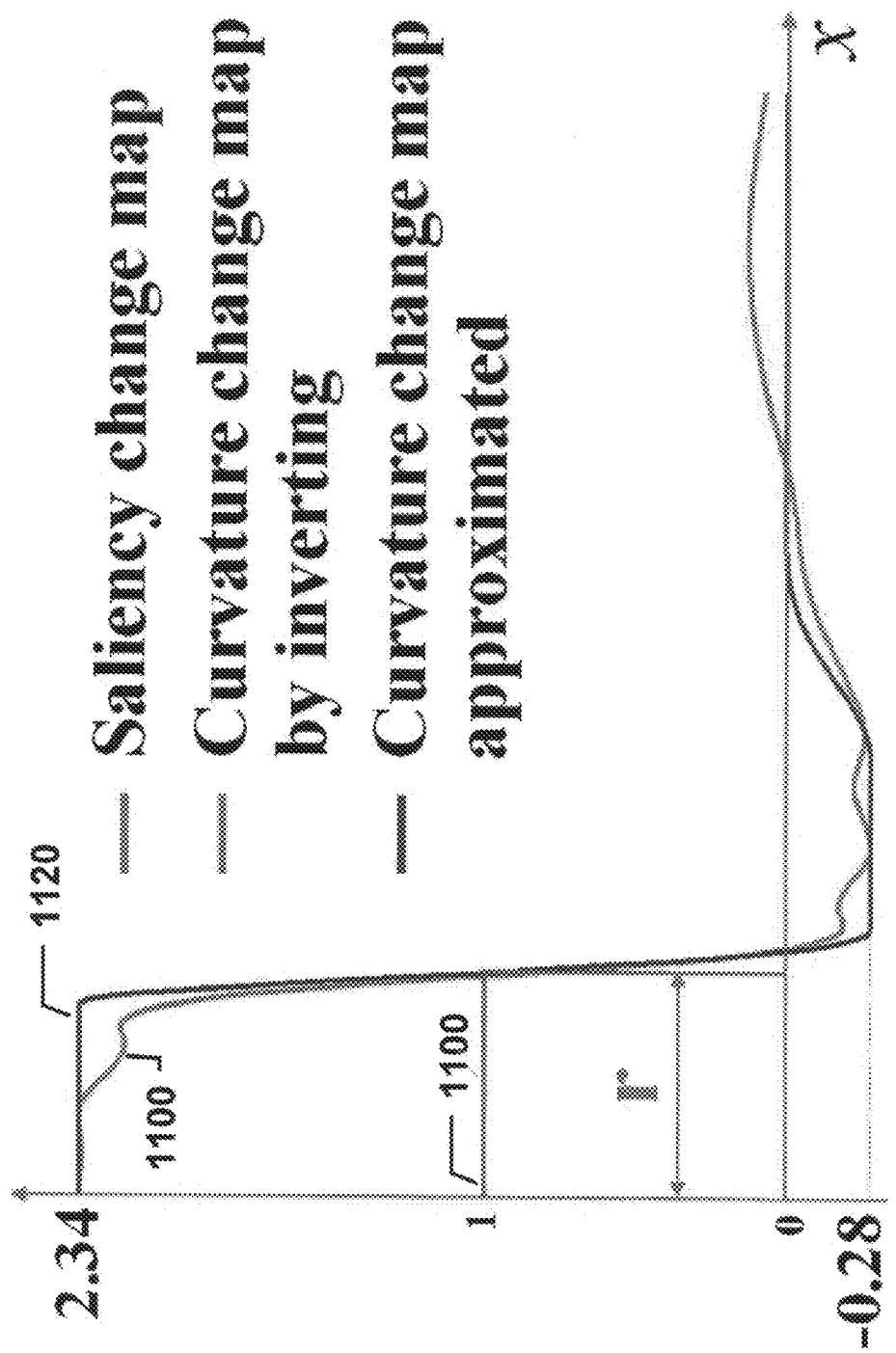
FIG. 11 is a graph of a curvature change map generated by multi-scale summation using an example Persuasion filter, according to an embodiment of the present invention.

FIG. 11 is a graph of a curvature change map generated by multi-scale summation using an example Persuasion filter, according to an embodiment of the present invention. The red line 1100 represents the saliency change map. The green line 1110 represents a curvature change map according to the center-surround equations presented above. The blue line 1120 represents an approximation of the curvature change map depicted by the green line 1110. Here, $\lambda_+ = 2.34$ and $\lambda_- = -0.28$. As can be seen by the blue line 1120 representing the approximation of the curvature change map, vertices relatively close to the saliency change map along the x axis are amplified, vertices at an intermediate distance are suppressed, and vertices beyond the intermediate distance are unaltered.

Figure 12:
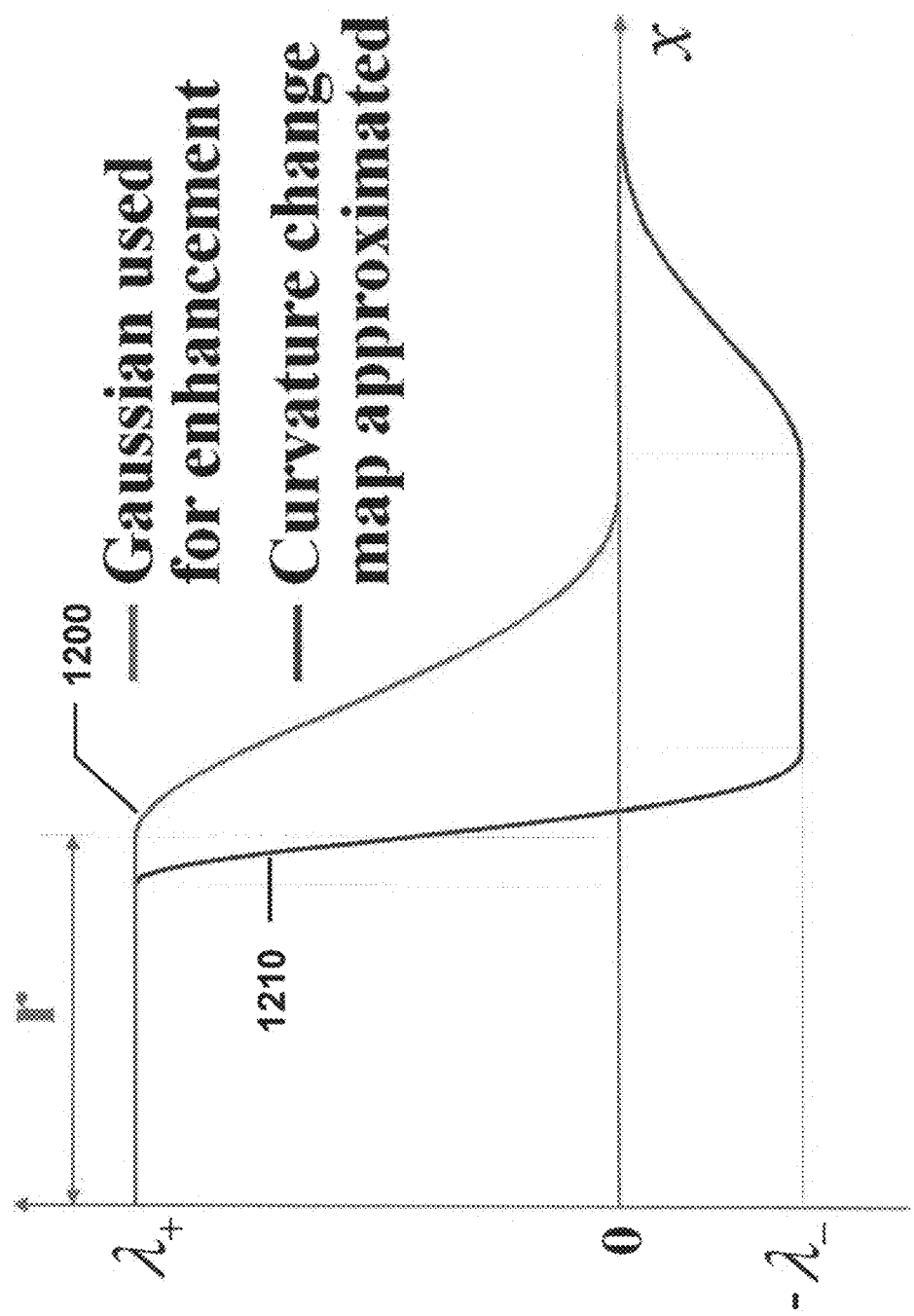
FIG. 12 is a graph comparing an example Gaussian filter and an example Persuasion filter.

FIG. 12 is a graph comparing an example Gaussian filter and an example Persuasion filter. As can be seen, the red line 1200 representing the Gaussian filter only amplifies vertices within a certain distance along the x axis from a region. On the other hand, the green line 1210 representing the curvature change map generated by the Persuasion filter shows that vertices relatively close along the x axis amplified, vertices at an intermediate distance are suppressed, and vertices beyond the intermediate distance are unaltered. Thus, the Persuasion filter both amplifies and suppresses vertices based on proximity to enhance saliency.

Figure 13A:
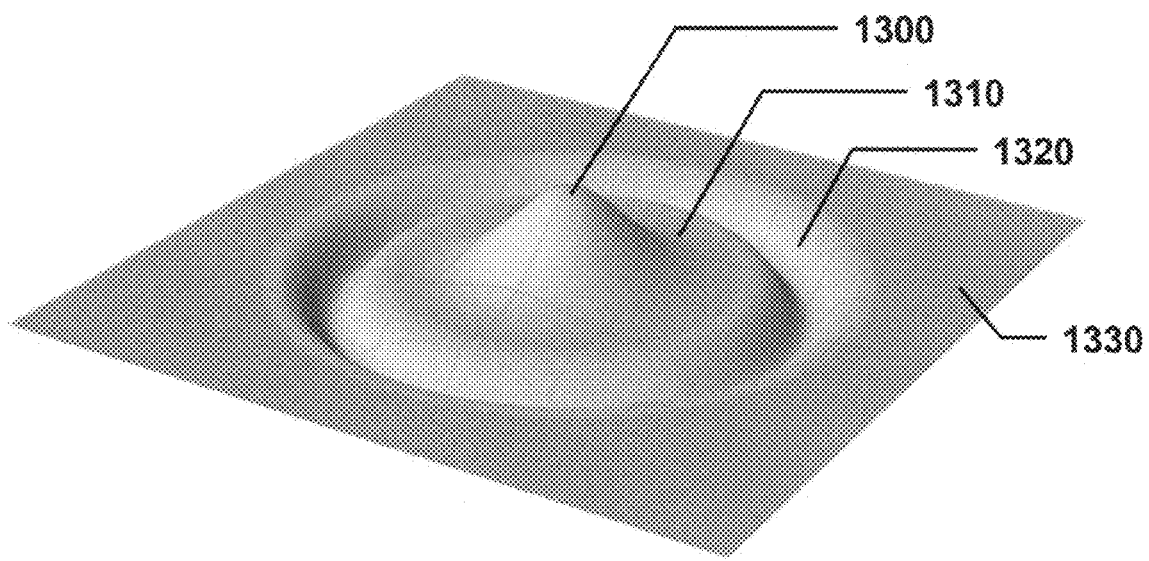
FIG. 13A is a color illustration illustrating a curvature change map for a circular region using a Persuasion filter, according to an embodiment of the present invention.

FIG. 13A is a color illustration depicting a curvature change map for a circular region using a Persuasion filter, according to an embodiment of the present invention. As can be seen, vertices at a first range 1300 along the x axis are raised, vertices at a second range 1310 along the x axis are relatively level, vertices at a third range 1320 along the x axis are suppressed, and vertices beyond the third range 1320 are unaltered 1330.

Figure 13B:
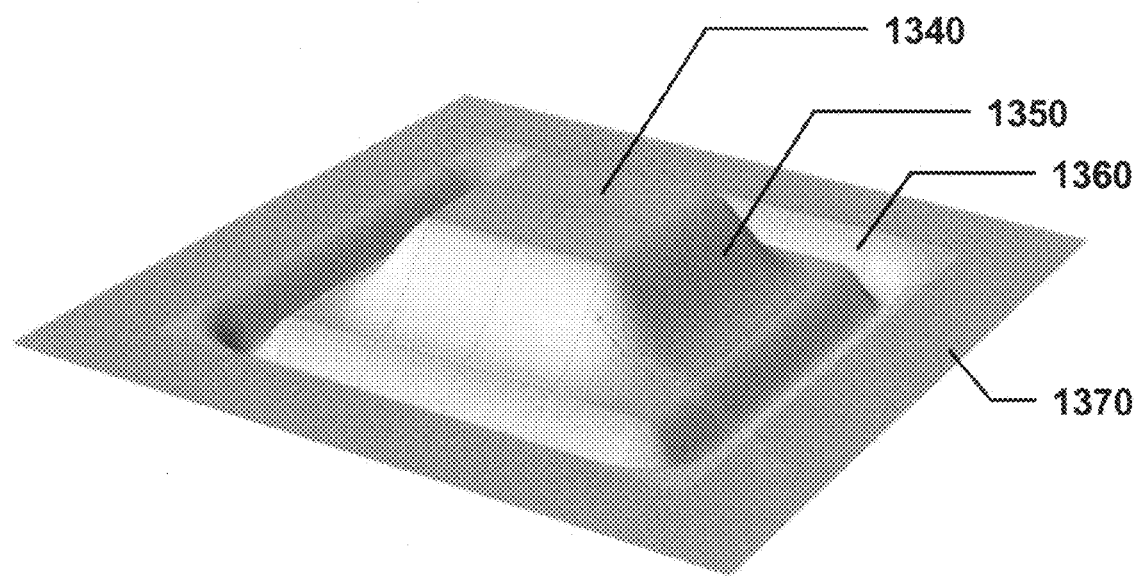
FIG. 13B is a color illustration illustrating a curvature change map for a rectangular region using a Persuasion filter, according to an embodiment of the present invention.

FIG. 13B is a color illustration depicting a curvature change map for a rectangular region using a Persuasion filter, according to an embodiment of the present invention. As can be seen, vertices at a first range 1340 along the x axis are raised and level, vertices at a second range 1350 along the x axis are raised, but slope towards being relatively level, vertices at a third range 1360 along the x axis are suppressed, and vertices beyond the third range 1360 are unaltered 1370.

Figure 14:
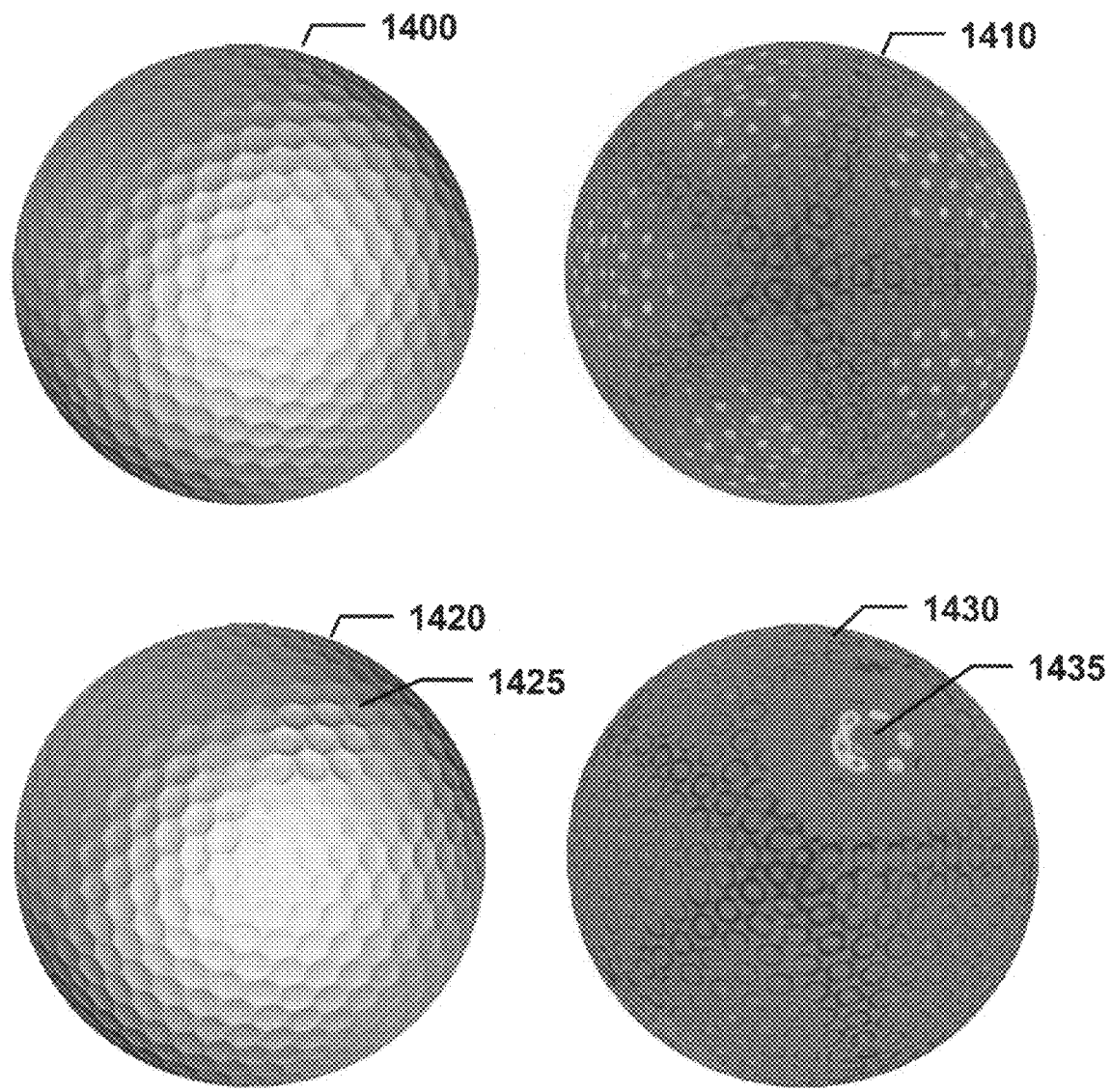
FIG. 14 is a color illustration illustrating saliency changes before and after application of a Persuasion filter on a Golf Ball Model, according to an embodiment of the present invention.

FIG. 14 is a color illustration depicting saliency changes before and after application of a Persuasion filter on a Golf Ball Model, according to an embodiment of the present invention. Golf Ball Model 1400 shows an illustration of a golf ball prior to application of the Persuasion filter. Golf Ball Model 1410 shows the original saliency of the golf ball. Golf Ball Model 1420 shows the result of applying the Persuasion filter to a region 1425. Golf Ball Model 1430 shows the saliency after applying the Persuasion filter to the region 1435. As can readily be seen, the region (1425, 1435) to which the Persuasion filter has been applied tends to draw attention.

The applications of the present invention are not intended to be limited in any way. For instance, some embodiments of the present invention may be used to design physical items. Designers may make clothing either more persuasive to encourage others to look at the wearer or less persuasive in the case of camouflage. Certain embodiments may also be used by designers and architects to create flashier vehicles, buildings, landscaping, home decorating schemes (including painting), or the like. Graphic artists may also use certain embodiments of the invention to draw attention to certain artistic features.

Some embodiments of the present invention may also be used in advertising. If a message is compelling enough to warrant notice, viewers of the advertisement are more likely to respond. Traditional ways of conveying information or messages have evolved around conventional forms of mass media, namely print (newspapers and magazines), and broadcast (television and radio). Individuals exposed to the messages typically have varying perceptual and cognitive responses based on the level of attention given the message, the saliency of the message, and the language and visual effects incorporated into the message.

In order for an advertisement to be successful, the advertisement must entice a user to view its content. This has been achieved by flashing advertisements or animations, but users often find such gimmicks to be irritating, and thus these attractive mechanisms may decrease the effectiveness of the advertisement. Some embodiments of the persuasion filter may be used to enhance certain advertisement features to gently persuade a user to look at an advertisement without causing distraction or annoyance.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    obtaining saliency values for a visual medium based on a plurality of visual channels, wherein the saliency values are obtained based on at least one of computer-generated modeling, user-specified input and eye-tracking;

aggregating the obtained saliency values; and
classifying regions of the visual medium based on the aggregated saliency values, wherein the aggregating further comprises taking into account at least one of an aggregation of channels, interaction between multiple channels, and superiority of some visual channels over others for eliciting visual attention,
wherein the plurality of visual channels comprises at least one visual channel having multiscale salient features,
wherein at least one of the plurality of visual channels comprises a gradient of color intensity defined by:

$$S_{gc}(v,\sigma)=|g(I,v,\sigma)-g(I,v,2\sigma)|$$

wherein I denotes color intensity values around a vertex v and $g(I,v,\sigma)$ is a Gaussian-weighted average of color intensity of vertices in neighborhood $N(v,2\sigma)$.

2. The method of claim 1, wherein at least one of the visual channels comprises different scales and the aggregation comprises non-linear suppression.

3. The method of claim 1, further comprising:
increasing or decreasing saliency values of at least one region of the visual medium based on the classification.

4. The method of claim 1, wherein final saliency values for the at least one visual channels having multiscale salient features at a vertex v is a normalized sum of saliency at all scales.

5. A method, comprising:
obtaining saliency values for a visual medium based on a plurality of visual channels, wherein the saliency values are obtained based on at least one of computer-generated modeling, user-specified input and eye-tracking;
aggregating the obtained saliency values; and
classifying regions of the visual medium based on the aggregated saliency values, wherein the aggregating further comprises taking into account at least one of an aggregation of channels, interaction between multiple channels, and superiority of some visual channels over others for eliciting visual attention,
wherein the plurality of visual channels comprises at least one visual channel having multiscale salient features,
wherein at least one of the plurality of visual channels comprises color opponency defined by:

$$RG(v,\sigma)=|(g(R,v,\sigma)-g(G,v,\sigma))-(g(R,v,2\sigma)-g(G,v,2\sigma))|$$

$$BY(v,\sigma)=|(g(B,v,\sigma)-g(Y,v,\sigma))-(g(B,v,2\sigma)-g(Y,v,2\sigma))|$$

wherein $RG(v,\sigma)$ denotes red/green and green/red double opponency and $BY(v,\sigma)$ denotes blue/yellow and yellow/blue double opponency at a scale $\sigma$ and a final saliency value $S_{co}(v,\sigma)$ from the color opponency for a vertex v at a scale $\sigma$ is the average of $RG(v,\sigma)$ and $BY(v,\sigma)$.

6. An apparatus, comprising:
an obtaining unit configured to obtain saliency values for a visual medium based on a plurality of visual channels, wherein the saliency values are obtained based on at least one of computer-generated modeling, user-specified input and eye-tracking;
an aggregating unit configured to aggregate the obtained saliency values; and
a classifying unit configured to classify regions of the visual medium based on the aggregated saliency values,
wherein the aggregating unit is further configure to take into account at least one of an aggregation of channels, interaction between multiple channels, and superiority of some visual channels over others for eliciting visual attention,
wherein the plurality of visual channels comprises at least one visual channel having multiscale salient features,
wherein at least one of the plurality of visual channels comprises a gradient of color intensity defined by:

$$S_{gc}(v,\sigma)=|g(I,v,\sigma)-g(I,v,2\sigma)|$$

wherein I denotes color intensity values around a vertex v and $g(I,v,\sigma)$ is a Gaussian-weighted average of color intensity of vertices in neighborhood $N(v,2\sigma)$.

7. The apparatus of claim 6, wherein at least one of the visual channels comprises different scales and the aggregation comprises non-linear suppression.

8. The apparatus of claim 6, further comprising:
a saliency adjustment unit configured to increase or decrease saliency values of at least one region of the visual medium based on the classification by the classifying unit.

9. The apparatus of claim 6, wherein final saliency values for the at least one visual channels having multiscale salient features at a vertex v is a normalized sum of saliency at all scales.

10. An apparatus, comprising:
an obtaining unit configured to obtain saliency values for a visual medium based on a plurality of visual channels, wherein the saliency values are obtained based on at least one of computer-generated modeling, user-specified input and eye-tracking;
an aggregating unit configured to aggregate the obtained saliency values; and
a classifying unit configured to classify regions of the visual medium based on the aggregated saliency values,
wherein the aggregating unit is further configure to take into account at least one of an aggregation of channels, interaction between multiple channels, and superiority of some visual channels over others for eliciting visual attention,
wherein the plurality of visual channels comprises at least one visual channel having multiscale salient features,
wherein at least one of the plurality of visual channels comprises color opponency defined by:

$$RG(v,\sigma)=|(g(R,v,\sigma)-g(G,v,\sigma))-(g(R,v,2\sigma)-g(G,v,2\sigma))|$$

$$BY(v,\sigma)=|(g(B,v,\sigma)-g(Y,v,\sigma))-(g(B,v,2\sigma)-g(Y,v,2\sigma))|$$

wherein $RG(v,\sigma)$ denotes red/green and green/red double opponency and $BY(v,\sigma)$ denotes blue/yellow and yellow/blue double opponency at a scale $\sigma$ and a final saliency value $S_{co}(v,\sigma)$ from the color opponency for a vertex v at a scale $\sigma$ is the average of $RG(v,\sigma)$ and $BY(v,\sigma)$.

11. A method, comprising:
calculating, using a calculating unit implemented by a processor, a change in mean curvature for a plurality of vertices around a region; and displacing, using a displacement unit, the vertices in accordance with the calculated change in mean curvature to change a saliency of the region, wherein the mean curvature values are displaced using a persuasion filter, which
displaces the vertices in the region defined as $$P(v)=v-\Delta C(\text{dist}(v))\cdot d\cdot n$$

wherein $db(v)$ is a distance from a boundary of a region to a vertex v, $\text{dist}(v)$ is $r+db(v)$ if v is outside of the region and $r-db(v)$ if v is inside of the region, d is a displacement in a normal direction n to v from a bilateral mesh filter, and $\Delta C(\text{dist}(v))$ is the curvature change map.

12. The method of claim 11, wherein the change in mean curvature is a weighted difference of a first and a second Gaussian average.

13. The method of claim 12, wherein the first Gaussian average is at a finer scale than the second Gaussian average.

14. The method of claim 11, wherein the persuasion filter is applied a plurality of times to the region.

15. An apparatus, comprising:
a calculating unit configured to calculate a change in mean curvature for a plurality of vertices around a region; and
a displacement unit configured to displace the vertices in accordance with the calculated change in mean curvature to change a saliency of the region,
wherein the mean curvature values are displaced using a persuasion filter, which displaces the vertices in the region defined as $P(v) = v - \Delta C(\text{dist}(v)) \cdot d \cdot n$ wherein db(v) is a distance from a boundary of a region to a vertex v, dist(v) is r+db(v) if v is outside of the region and r−db(v) if v is inside of the region, d is a displacement in a normal direction n to v from a bilateral mesh filter, and $\Delta C(\text{dist}(v))$ is the curvature change map.

16. The apparatus of claim 15, wherein the calculating unit is configured to calculate the change in mean curvature as a weighted difference of a first and a second Gaussian average.

17. The apparatus of claim 16, wherein the calculating unit is configured to calculate the first Gaussian average at a finer scale than the second Gaussian average.

18. The apparatus of claim 15, wherein the displacement unit is configured to apply the persuasion filter to the region a plurality of times.

* * * * *